United States Patent
Lee (10) Patent No.: US 7,286,915 B2
(45) Date of Patent: Oct. 23, 2007

(54) APPARATUS AND METHOD FOR CONTROLLING COMMAND TORQUES IN HYBRID ELECTRIC VEHICLE

(75) Inventor: Se Yong Lee, Suwon-si (KR)

(73) Assignee: Hyundai Motor Company, Seoul (KR)

( * ) Notice: Subject to any disclaimer, the term of this patent is extended or adjusted under 35 U.S.C. 154(b) by 129 days.

(21) Appl. No.: 11/300,115

(22) Filed: Dec. 13, 2005

(65) Prior Publication Data

US 2007/0102206 A1    May 10, 2007

(30) Foreign Application Priority Data

Nov. 4, 2005   (KR) ............... 10-2005-0105618

(51) Int. Cl.
*B60L 9/00*   (2006.01)
(52) U.S. Cl. ............... 701/22; 477/3; 180/65.8
(58) Field of Classification Search ............ 701/22, 701/36, 54, 70; 477/2, 3, 7, 15, 16; 180/65.1–65.8
See application file for complete search history.

(56) References Cited

U.S. PATENT DOCUMENTS 6,827,167 B2 * 12/2004 Cikanek et al. .......... 180/65.6
6,991,581 B2 * 1/2006 Murakami et al. ........... 477/3
6,994,652 B2 * 2/2006 Atarashi et al. ............. 477/3

FOREIGN PATENT DOCUMENTS

JP    2004-339943    12/2004

* cited by examiner

*Primary Examiner*—Richard M. Camby
(74) *Attorney, Agent, or Firm*—Morgan Lewis & Bockius LLP (57) ABSTRACT

An apparatus and method for controlling command torques in a hybrid electric vehicle, in which information on the command torques maintains an appropriate range by dividing the function of a hybrid control unit (HCU) into first and second levels. A function is included for setting operating points of the HCU itself at the first level and for monitoring torques of the first level at the second level. Whether or not the output command torques are within the restriction values prior to output of the first level is ______ and outputs are restricted to the restriction values when the output command torques exceed the restriction values, thereby preventing a hardware damage in advance. Further a drive demand torque calculated at the second level is compared with a wheel torque of the first level, so that it is possible to determine the suitability of the output command torques.

7 Claims, 9 Drawing Sheets

FIG. 5b

APPARATUS AND METHOD FOR CONTROLLING COMMAND TORQUES IN HYBRID ELECTRIC VEHICLE

CROSS-REFERENCE TO RELATED APPLICATION

This application claims priority to and the benefit of Korean Patent Application No. 10-2005-0105618 filed in the Korean Intellectual Property Office on Nov. 4, 2005, the entire contents of which are incorporated herein by reference.

BACKGROUND OF THE INVENTION

1. Field of the Invention

The present invention relates generally to a hybrid electric vehicle (HEV). More particularly, the present invention relates to an apparatus and method for controlling command torques in a hybrid electric vehicle.

2. Description of Related Art

A hybrid electric vehicle (HEV) refers to a next-generation motor vehicle which, by means of combined mounting of an internal combustion engine and a motor engine, significant reduction of a body's weight and minimization of air resistance, substantially reduces fuel consumption and an amount of harmful gas emissions as compared with existing ordinary vehicles. The HEV can reduce the amount of harmful gas emissions by 90% or more over existing vehicles, thus being capable of decreasing air pollution and improving the surrounding environment of an urban area as well as fitting in with traffic control, road plan and so on. For this reason, the HEV is called an "eco-car".

The HEV is driven with high fuel-efficiency and has combination of advantages as it has both a gasoline engine and an electric engine. Therefore, its vital function is that it can be switched between its internal combustion engine and its motor engine so as to be suitable for the road and surrounding environment. In this manner, the HEV, making use of both the internal combustion engine and the motor engine as a power source, has been developed in every country for a long time. Today there are just a few mass-produced hybrid vehicles in the world. In the future, there is a strong possibility that many companies will launch into the HEV market. However, the HEV may have a different system due to a difference between two design concepts of "advancement of the internal combustion engine" and "development of the electric car."

Figure 1:
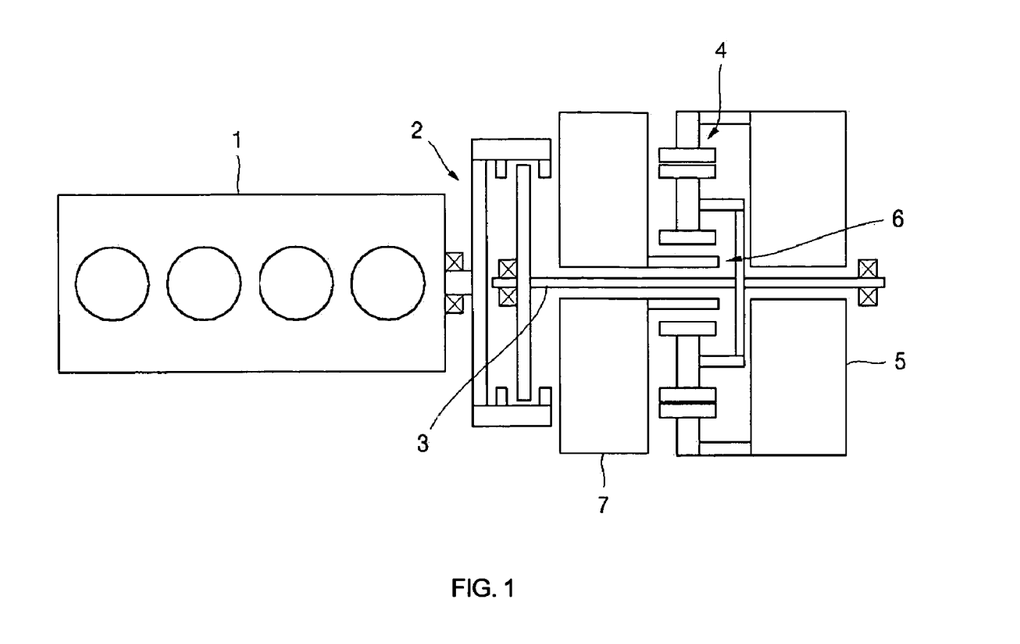
FIG. 1 shows the structure of the power train of an ordinary hard type hybrid electric vehicle (HEV)

FIG. 1 shows the structure of the power train of an ordinary hard type HEV. As shown in FIG. 1, the structure of the power train of an ordinary hard HEV includes an internal combustion engine 1 generating rotating power, an engine clutch 2 connected to an output of the internal combustion engine 1, carrier gear 3 connected to the engine clutch 2, a ring gear 4 connected to the carrier gear, a driving motor 5 generating rotating power and connected to the ring gear 4, a sun gear 6 connected between the carrier gear 3 and the ring gear 4, a generator 7 connected to the sun gear 6, and a battery 8 (shown in FIG. 2) supplying power to the driving motor 5.

The driving motor 5 and generator 7 has a structure of ISG (Integrated Starter & Generator).

The HEV having this power train structure has different travel modes selected on the basis of its speed during traveling.

Figure 2A:
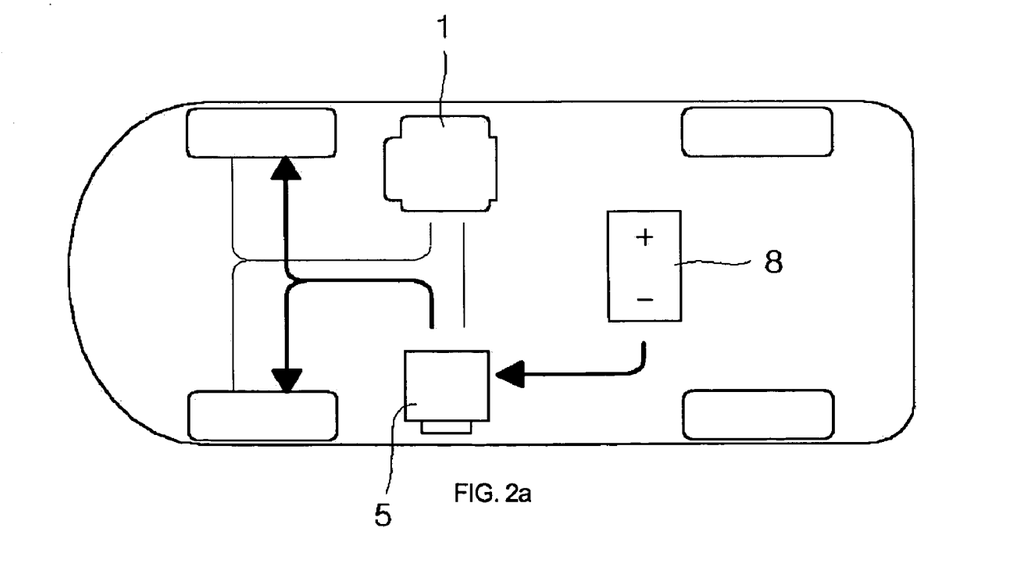
FIGS. 2*a* through 2*e* show travel modes of an ordinary HEV.
Figure 2B:
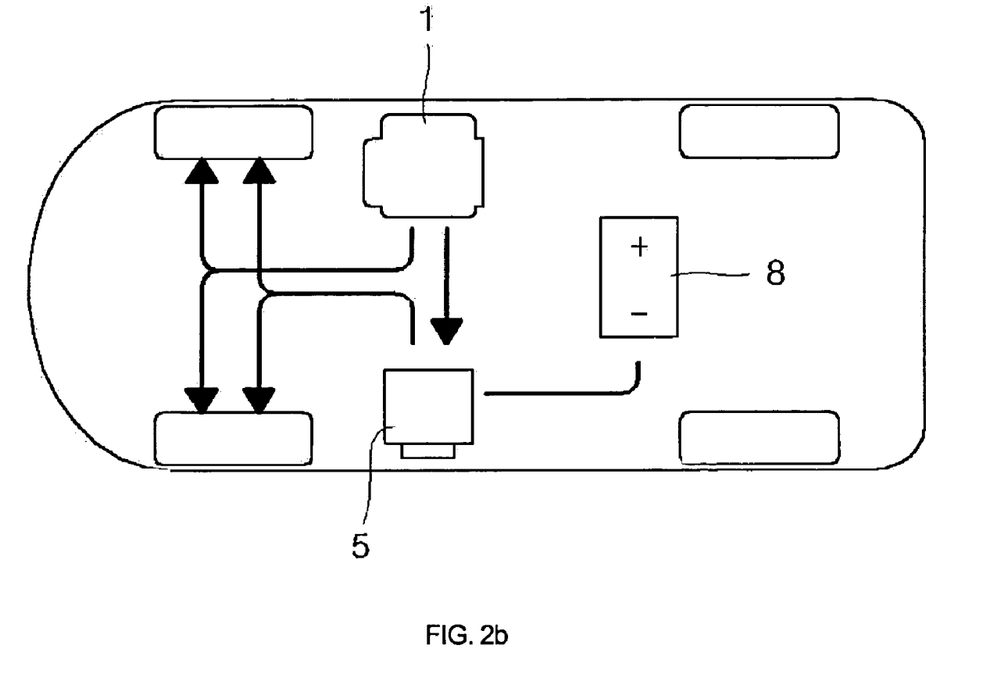
Figure 2C:
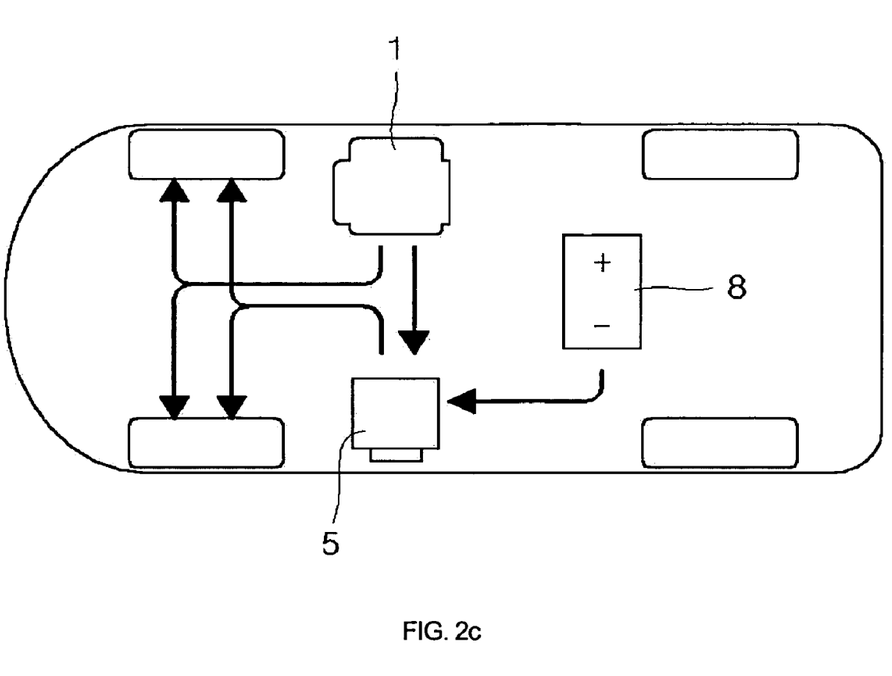
Figure 2D:
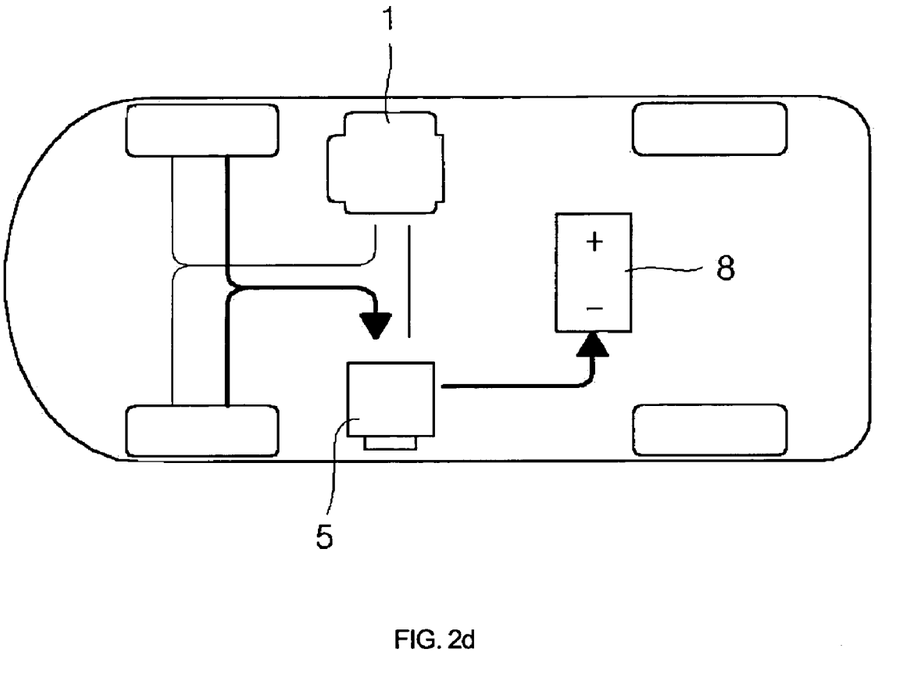
Figure 2E:
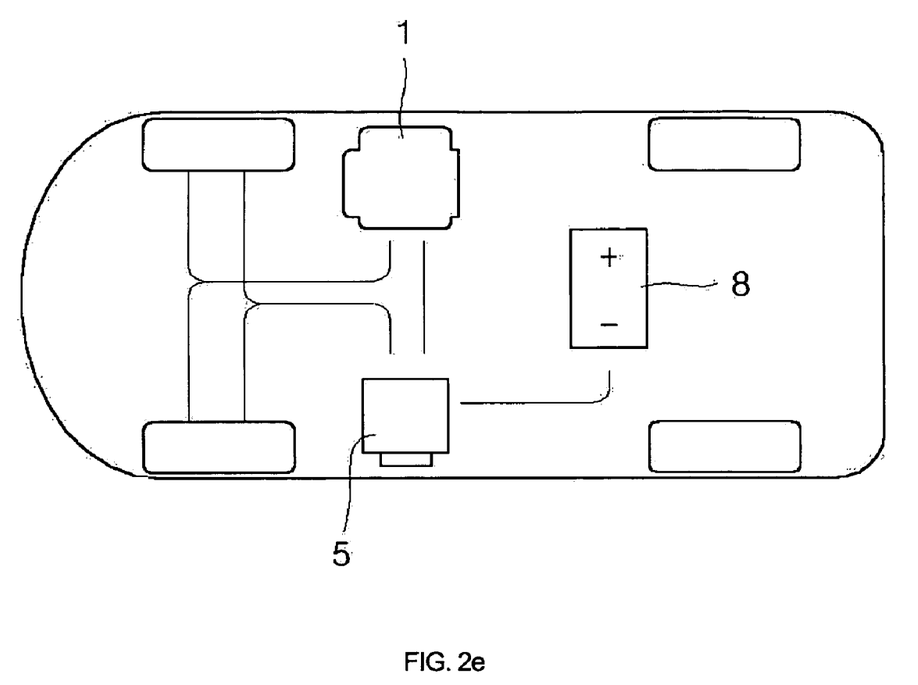

FIGS. 2a through 2e show travel modes of an ordinary HEV. As shown in FIG. 2a, when departing or during low-speed traveling, the HEV is driven by the driving motor 5 supplied with power from the battery 8. As shown in FIG. 2b, when in normal motion, the HEV is driven in the travel mode where the internal combustion engine 1 and the driving motor 5 combine to provide optimal fuel economy. As shown in FIG. 2c, when accelerating or hill-climbing, the HEV is driven by the aid of power from the driving motor 5. As shown in FIG. 2d, when decelerating, the HEV collects energy by using the driving motor 5 as a generator to charge the battery 8. As shown in FIG. 2e, when stopping, the HEV stops the engine to lessen unnecessary fuel consumption and emission of exhaust gases.

The HEV is equipped with a hybrid control unit (HCU). The HCU is adapted to set and output speeds and torques of the engine, generator and motor so as to enable the HEV to be driven at optimal system setting.

However, in the conventional HCU, when calculation by which its own torque is set is abnormal, information on command torques is beyond an appropriate range, which results in breakage of a hybrid dynamic system, and so on.

In this regard, there is disclosed U.S. Pat. No. 6,490,511. In this document, a driver demand torque is set for a main controller for an HCU, and then compared with an output shaft torque estimated at an independent plausibility check (IPC). When the estimated output shaft torque is greater than the driver demand torque, the vehicle stops driving. Thereby, the command torque information maintains an appropriate range.

However, the technique disclosed in U.S. Pat. No. 6,490,511 has the following problems:

1. There is neither a signal diagnosis of inputs nor a limp-home strategy of faults (typically, in the case of using redundant sensors, a fault management approach used when any one of the sensors is out of order), wherein the inputs and faults have an influence on setting of the driver demand torque of the main controller for the HCU.

2. The HCU merely sets torques of the engine, motor and generator, and an actually obtained torque of each of the engine and motor is a monitoring target of each of the engine and motor, thus being discriminated from a function of the HCU. Moreover, an estimated output torque in the IPC may have an incorrect value, so that the estimated output torque is not required. Hence, it is sufficient only to check whether a target torque of each of the engine and motor based on the driver demand is exactly achieved or not.

3. Even when an input of the main controller of the HCU causes trouble, there is no limitation to the setting of the driver torque. In this case, a torque monitoring function may be insufficient.

4. There is no concrete countermeasure against an abnormal torque. In the case of the existing HEV, a system reaction takes place by vehicular shut-off, which is merely effective for extreme cases. Thus, the system reaction should be varied according to different abnormal function types.

5. It is checked whether to meet output torque relation by a planetary gear which is mainly used in the hard type HEV. In this case, when the abnormal torque is output, it is impossible to prevent damage of hardware.

SUMMARY OF THE INVENTION

Embodiments of the present invention provide an apparatus and method for controlling command torques in a hybrid electric vehicle, capable of causing information on the command torques to maintain an appropriate range by dividing the function of a hybrid control unit (HCU) into first and second levels and by having a function of setting operating points of the HCU itself at the first level and a function of monitoring torques of the first level at the second level.

Embodiments of the present invention also provide an apparatus and method for controlling command torques in a hybrid electric vehicle, which is capable of checking whether or not the output command torques are within the restriction values prior to output of the first level and which is capable of restricting outputs to the restriction values when the output command torques exceed the restriction values, thereby preventing a hardware damage in advance.

Embodiments of the present invention further provide an apparatus and method for controlling command torques in a hybrid electric vehicle, capable of comparing a drive demand torque calculated at the second level with a wheel torque of the first level, thereby determining the suitability of the output command torques.

In an exemplary embodiment of the invention, there is provided an apparatus for controlling command torques in a hybrid electric vehicle. Such an apparatus may include an accelerator position sensor for sensing a position of an accelerator and outputting the sensed result as an electric signal; a speed sensor for sensing a speed of the hybrid electric vehicle and outputting the sensed result as an electric signal; a shift position sensor for sensing a position of a speed change gear and outputting the sensed result as an electric signal; a hybrid control unit for, when first level monitoring is initiated, diagnosing the signals received from the accelerator position sensor, speed sensor and shift position sensor, restricting and outputting output values of the signals when the diagnosed signals are abnormal, setting a driver demand torque, setting operating points such as an engine demand torque, an engine rpm (revolution per minute), a generator demand torque, a generator rpm, a driving motor demand torque, a driving motor rpm and so on, restricting outputs to respective restriction values when the respective demand torques and rpms are not within the restriction values, and outputting the respective demand torques and rpms; and a driver for driving an engine, a generator and a driving motor.

Preferably, when second level monitoring is initiated, the hybrid control unit may diagnose the input signals received from the accelerator position sensor, speed sensor and shift position sensor, it may request zero torques of the engine and motor through reset when writing of the signals of the accelerator position sensor, speed sensor and shift position sensor on a RAM (Random Access Memory) is abnormal or when the signals of the accelerator position sensor, speed sensor and shift position sensor are abnormal, it may set the driver demand torque, it may combine the engine and motor demand torques on the first level to calculate a first level output torque, it may request the zero torques of the engine and motor through reset when the driver demand torque is less than the first level output torque, and it may output a control signal for resetting software when each of the engine and the motor does not have the zero torque.

Preferably, the driver may include: a charge controller for controlling the charge of a battery; the battery for supplying power needed to drive the driving motor; an engine controller for outputting a control signal for controlling an internal combustion engine according to the control of the hybrid control unit; an engine electronic control unit for controlling the internal combustion engine according to the control of the engine controller, the internal combustion engine for generating rotating power using fuel energy; a generator controller for outputting a control signal for controlling a generator according to the control of the hybrid control unit; a driving motor controller for outputting a control signal for controlling the driving motor according to the control of the hybrid control unit; an inverter for outputting a driving signal for driving the generator and the driving motor according to the control signals of the generator controller and the driving motor controller; the generator for generating electric energy using the rotating power according to the driving signal of the inverter; and the driving motor for generating rotating power using the electric energy according to the driving signal of the inverter.

According to another aspect of the invention, there is provided a method for controlling command torques in a hybrid electric vehicle. The method includes the steps of: when starting first level monitoring, diagnosing signals received from an accelerator position sensor, a speed sensor and a shift position sensor as well as restricting and outputting output values when the diagnosed signals are abnormal; setting a driver demand torque; setting operating points such as an engine demand torque, an engine rpm (revolution per minute), a generator demand torque, a generator rpm, a driving motor demand torque and a driving motor rpm; determining whether or not the respective demand torques and rpms are within restriction values thereof; restricting outputs to the respective restriction values when the respective demand torques and rpms are not within the restriction values; and outputting the respective demand torques and rpms and terminating the first level monitoring.

Preferably, the step of diagnosing the signals of the first level monitoring may include the sub-steps of: receiving the signal of the accelerator position sensor, diagnosing the signal of the accelerator position sensor, and determining whether the signal of the accelerator position sensor is abnormal or not; when the signal of the accelerator position sensor is abnormal, restricting and outputting the output value of the signal of the accelerator position sensor; receiving the signal of the speed sensor, diagnosing the signal of the speed sensor, and determining whether the signal of the speed sensor is abnormal or not; when the signal of the speed sensor is abnormal, restricting and outputting the output value of the signal of the speed sensor; receiving the signal of the shift position sensor; diagnosing the signal of the shift position sensor, and determining whether the signal of the shift position sensor is abnormal or not; and when the signal of the shift position sensor is abnormal, restricting and outputting the output value of the signal of the shift position sensor.

According to yet another aspect of the invention, there is provided a method for controlling command torques in a hybrid electric vehicle. The method includes the steps of: when starting second level monitoring, diagnosing signals received from an accelerator position sensor, a speed sensor and a shift position sensor, and requesting zero torques of an engine and a motor through reset when writing of the signals of the accelerator position sensor, speed sensor and shift position sensor on a RAM (Random Access Memory) is abnormal or when the signals of the accelerator position sensor, speed sensor and shift position sensor are abnormal; setting a driver demand torque, combining the engine and motor demand torques on the first level to calculate a first level output torque; determining whether the driver demand torque is less than the first level output torque or not, and when the driver demand torque is less than the first level output torque, requesting the zero torques of the engine and motor through reset; and determining whether each of the engine and the motor has the zero torque or not, resetting software when each of the engine and the motor does not have the zero torque, and terminating the second level monitoring.

Preferably, the step of diagnosing the signals of the second level monitoring may include the sub-steps of: receiving the signal of the accelerator position sensor, checking suitability of the writing of the signal of the accelerator position sensor on the RAM, and determining whether the writing of the signal of the accelerator position sensor on the RAM is abnormal or not; when the writing of the signal of the accelerator position sensor on the RAM is not abnormal, diagnosing the signal of the accelerator position sensor, and determining whether the signal of the accelerator position sensor is abnormal or not; when the signal of the accelerator position sensor is not abnormal, outputting the signal of the accelerator position sensor; receiving the signal of the speed sensor, checking suitability of the writing of the signal of the speed sensor on the RAM, and determining whether the writing of the signal of the speed sensor on the RAM is abnormal or not; when the writing of the signal of the speed sensor on the RAM is not abnormal, diagnosing the signal of the speed sensor, and determining whether the signal of the speed sensor is abnormal or not; when the signal of the speed sensor is not abnormal, outputting the signal of the speed sensor; receiving the signal of the shift position sensor, checking suitability of the writing of the signal of the shift position sensor on the RAM, and determining whether the writing of the signal of the shift position sensor on the RAM is abnormal or not; when the writing of the signal of the shift position sensor on the RAM is not abnormal, diagnosing the signal of the shift position sensor, and determining whether the signal of the shift position sensor is abnormal or not; when the signal of the shift position sensor is not abnormal, outputting the signal of the shift position sensor; and requesting the zero torques of the engine and motor through reset when the writing of the signals of the accelerator position sensor, speed sensor and shift position sensor on the RAM is abnormal or when the signals of the accelerator position sensor, speed sensor and shift position sensor are abnormal.

BRIEF DESCRIPTION OF THE DRAWINGS

The above and other objectives, features and advantages of the present invention will be more apparent from the following detailed description taken in conjunction with the accompanying drawings, in which.

DETAILED DESCRIPTION OF THE PREFERRED EMBODIMENTS

Hereinafter, exemplary embodiments of the present invention will be described with reference to the accompanying drawings. In the following description and drawings, the same reference numerals are used to designate the same or similar components, and so repetition of the description on the same or similar components will be omitted.

Figure 3:
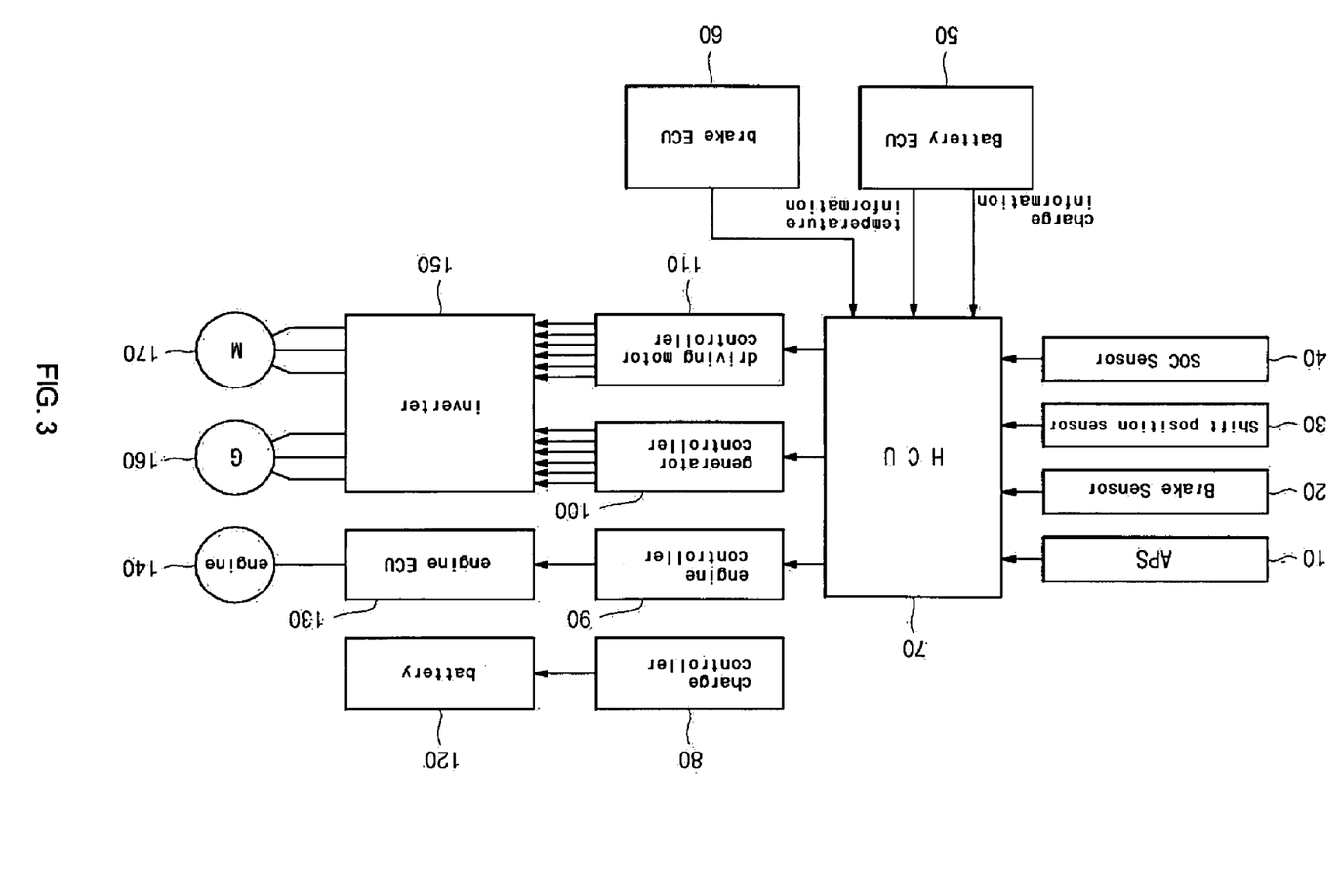
FIG. 3 is a block diagram showing the command torque control system of an HEV in accordance with an embodiment of the present invention.

As shown in FIG. 3, the command torque control system of an HEV is composed of: an accelerator position sensor (APS) 10 for sensing the position of an accelerator (or gas pedal) and outputting the sensed result as an electric signal. Brake sensor 20 senses operation of a brake and outputting the sensed result as an electric signal. A speed sensor 30 senses a speed of the HEV and outputs the sensed result as an electric signal. A shift position sensor 40 senses the position of a speed change gear and outputs the sensed result as an electric signal. A battery electronic control unit (ECU) 50 provides information on a battery state; a brake ECU 60 provides information on a braking state. A hybrid control unit (HCU) 70, when first level monitoring is initiated, diagnoses the input signals received from the APS, speed sensor and shift position sensor, restricts and outputs output values of the signals when the diagnosed signals are abnormal, sets a driver demand torque, sets operating points such as an engine demand torque, an engine rpm (revolution per minute), a generator demand torque, a generator rpm, a driving motor demand torque, a driving motor rpm etc., restricts outputs to respective restriction values when the respective demand torques and rpms are not within the restriction values, and outputs the respective demand torques and rpms. When second level monitoring is initiated, HCU 70 diagnoses the input signals received from the APS, speed sensor and shift position sensor, requesting zero torques of the engine and motor by means of reset when writing of the signals of the APS, speed sensor and shift position sensor on a RAM (Random Access Memory) is abnormal or when the signals of the APS, speed sensor and shift position sensor are abnormal, sets the driver demand torque, combines the engine and motor demand torques on the first level to calculate a first level output torque, requests the zero torques of the engine and motor by means of reset when the driver demand torque is less than the first level output torque, and outputs a control signal for resetting software when each of the engine and the motor does not have the zero torque.

A charge controller 80 controls the charge of a battery 120. The battery 120 supplies power needed for driving of a driving motor 170. An engine controller 90 outputs a control signal for controlling an internal combustion engine 140 according to the control of the HCU 70. An engine ECU 130 controls the internal combustion engine 140 according to the control of the engine controller 90. The internal combustion engine 140 generates rotating power using fuel energy. A generator controller 100 outputs a control signal for controlling a generator 160 according to the control of the HCU 70. A driving motor control 110 outputs a control signal for controlling a driving motor 170 according to the control of the HCU 70. An inverter 150 outputs a driving signal for driving the generator 160 and the driving motor 170 according to the control signals of the generator controller 100 and the driving motor controller 110. A generator 160 generates electric energy using the rotating power according to the driving signal of the inverter 150. The driving motor 170 generates rotating power using the electric energy according to the driving signal of the inverter 150.

The ECU, HCU and other controllers described herein may comprise a processor, memory and associated hardware, software or firmware as may be selected and programmed by a person of ordinary skill in the art based on the teachings herein.

Figure 4:
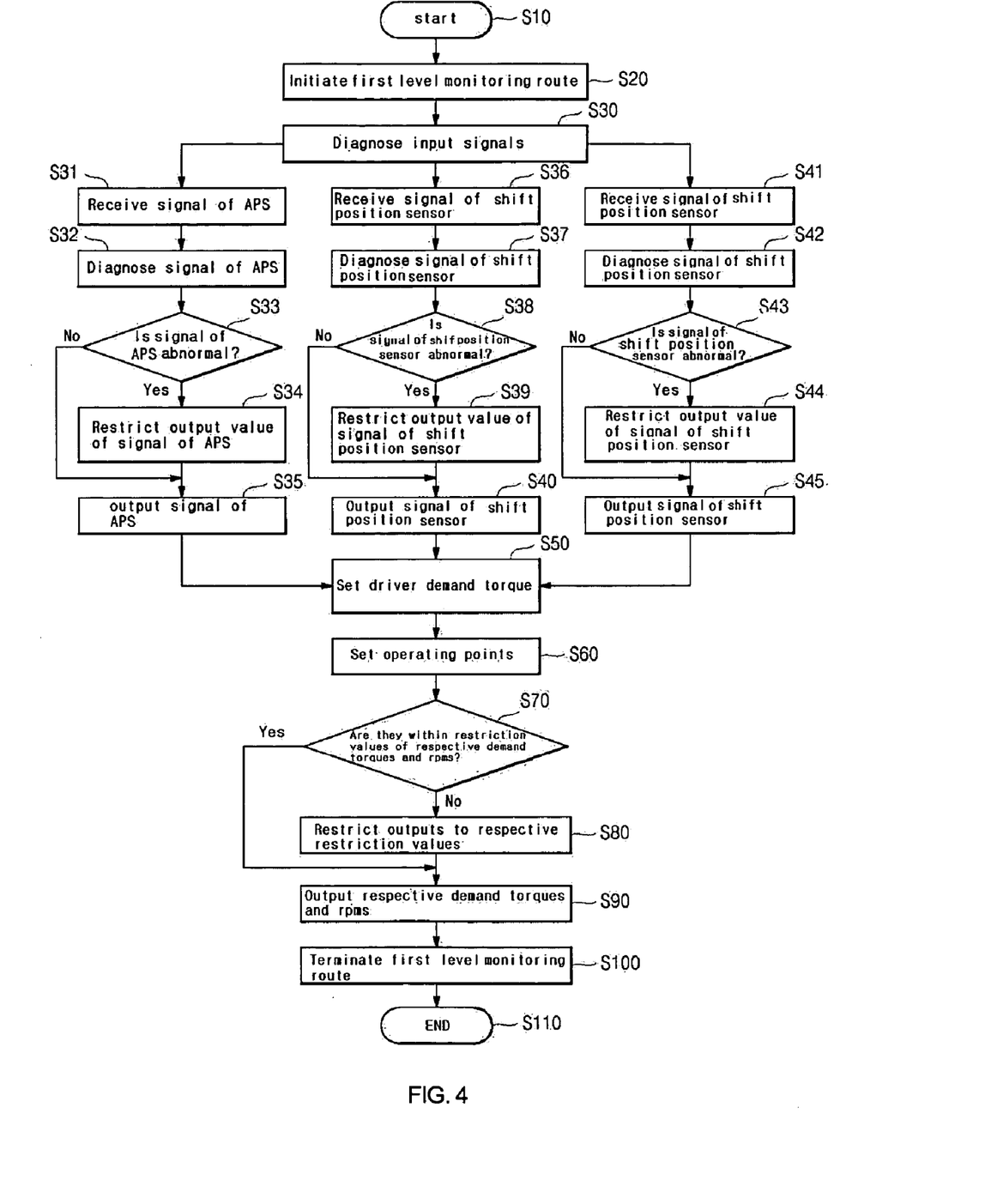
FIG. 4 is a flowchart showing the operation of a first level in a method for controlling command torques in an HEV in accordance with an embodiment of the present invention.

As shown in FIG. 4, the operation of a first level in a method for controlling command torques in an HEV includes a step S10 of starting operation, a step S20 of starting first level monitoring, a step S30 of diagnosing input signals received from the APS, speed sensor and shift position sensor and restricting and outputting output values when the diagnosed signals are abnormal, a step S50 of setting a driver demand torque, a step S60 of setting operating points such as an engine demand torque, an engine rpm, a generator demand torque, a generator rpm, a driving motor demand torque, a driving motor rpm etc., a step S70 of determining whether the respective demand torques and rpms are within their own restriction values or not, a step S80 of outputting the respective restriction values when the respective demand torques and rpms are not within their own restriction values, a step S90 of outputting the respective demand torques and rpms, and a step S100 of terminating the first level monitoring.

Further, as shown in FIG. 4, the step of diagnosing the input signals of the first level in the method for controlling command torques in the HEV includes a sub-step S31 of receiving the signal of the APS, a sub-step S32 of diagnosing the signal of the APS, a sub-step S33 of determining whether the signal of the APS is abnormal or not, a sub-step S34 of restricting the output value of the signal of the APS when the signal of the APS is abnormal, a sub-step S35 of outputting the signal of the APS, a sub-step S36 of receiving the signal of the speed sensor, a sub-step S37 of diagnosing the signal of the speed sensor, a sub-step S38 of determining whether the signal of the speed sensor is abnormal or not, a sub-step S39 of restricting the output value of the signal of the speed sensor when the signal of the speed sensor is abnormal, a sub-step S40 of outputting the signal of the speed sensor; a sub-step S41 of receiving the signal of the shift position sensor, a sub-step S42 of diagnosing the signal of the shift position sensor, a sub-step S43 of determining whether the signal of the shift position sensor is abnormal or not, a sub-step S44 of restricting the output value of the signal of the shift position sensor when the signal of the shift position sensor is abnormal, and a sub-step S45 of outputting the signal of the shift position sensor.

Figure 5A:
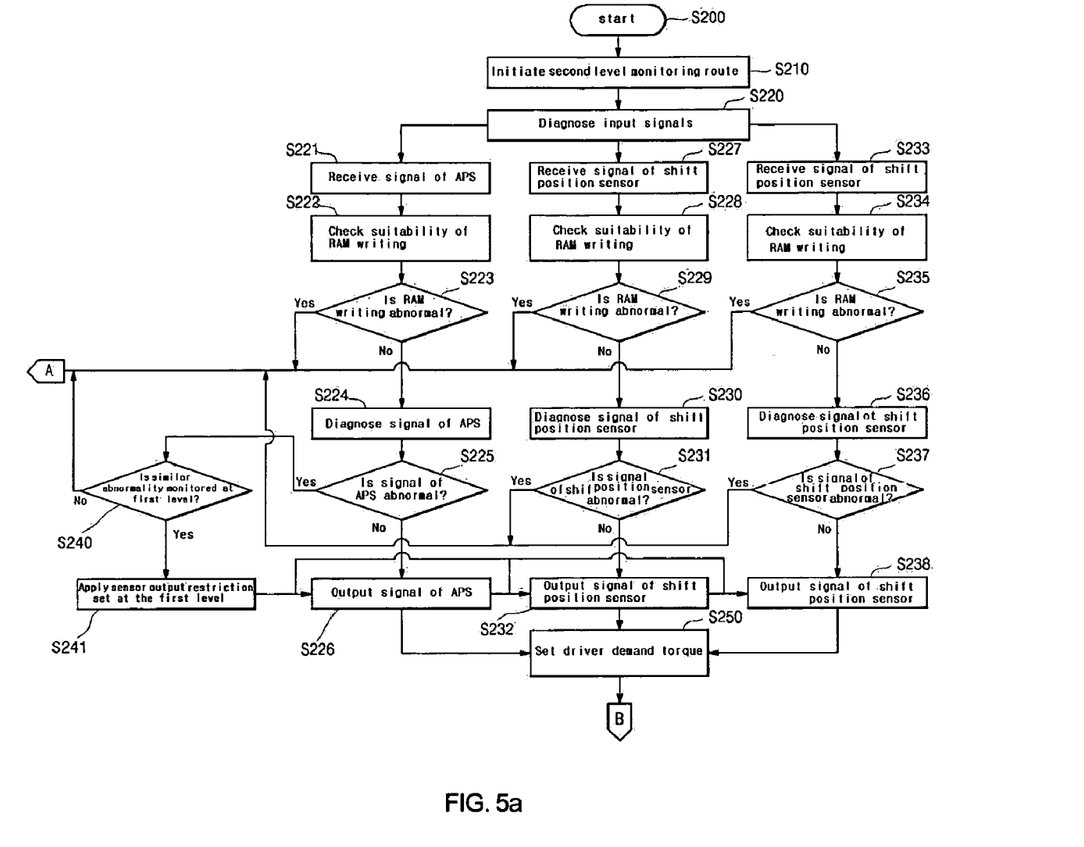
FIGS. 5*a* and 5*b* are flowcharts showing the operation of a second level in a method for controlling command torques in an HEV in accordance with an embodiment of the present invention, respectively.
Figure 5B:
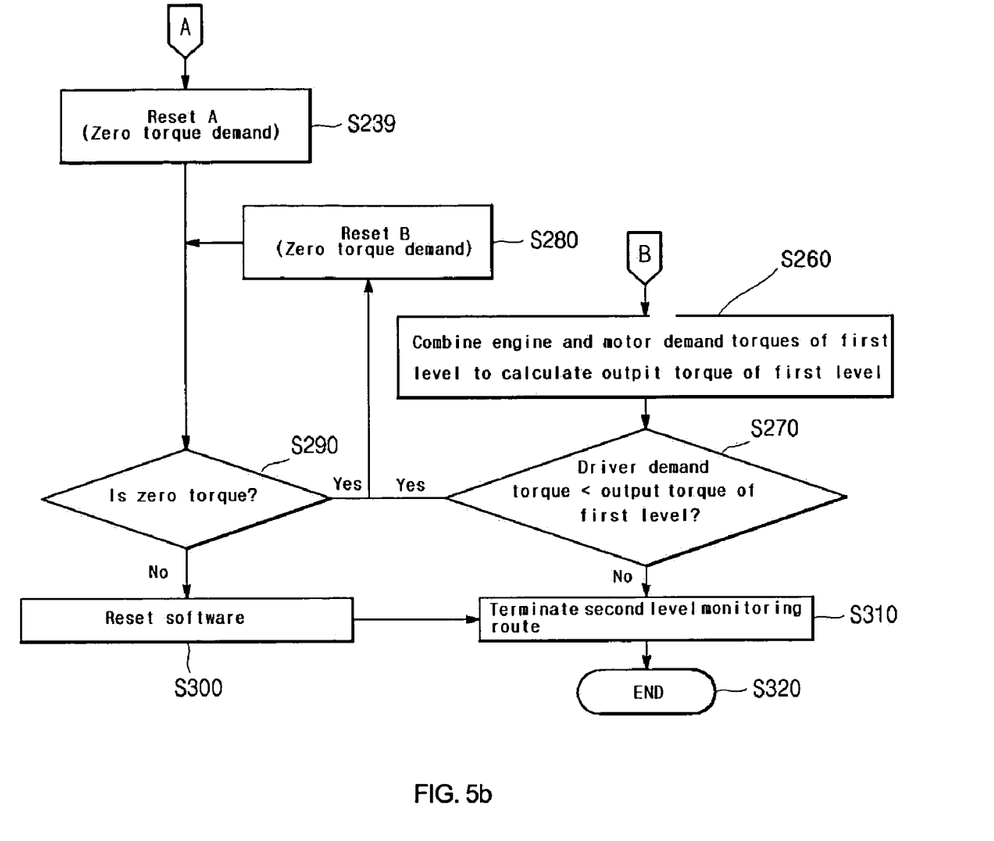

As shown in FIGS. 5a and 5b, the operation of a second level in a method for controlling command torques in an HEV includes a step S200 of starting operation, a step S210 of starting second level monitoring, a step S220 of diagnosing input signals received from the APS, speed sensor and shift position sensor and requesting zero torques of the engine and motor by means of reset when writing of the signals of the APS, speed sensor and shift position sensor on a RAM is abnormal or when the signals of the APS, speed sensor and shift position sensor are abnormal, a step S250 of setting the driver demand torque, a step S260 of combining the engine and motor demand torques on the first level to calculate a first level output torque, a step S270 of determining whether the driver demand torque is less than the first level output torque or not, a step of S280 of requesting the zero torques of the engine and motor by means of reset when the driver demand torque is less than the first level output torque, a step S290 of determining whether each of the engine and the motor has the zero torque or not, a step S300 of resetting software when each of the engine and the motor does not have the zero torque; a step S310 of terminating the second level monitoring, and a step S320 of terminating the operation.

Further, as shown in FIGS. 5a and 5b, the step of diagnosing the input signals of the second level in the method for controlling command torques in the HEV includes a sub-step S221 of receiving the signal of the APS, a sub-step S222 of checking suitability of the writing of the signal of the APS on the RAM, a sub-step S223 of determining whether the writing of the signal of the APS on the RAM is abnormal or not, a sub-step S224 of diagnosing the signal of the APS when the writing of the signal of the APS on the RAM is not abnormal, a sub-step S225 of determining whether the signal of the APS is abnormal or not, a sub-step S226 of outputting the signal of the APS when the signal of the APS is not abnormal, a sub-step S227 of receiving the signal of the speed sensor, a sub-step S228 of checking suitability of the writing of the signal of the speed sensor on the RAM, a sub-step S229 of determining whether the writing of the signal of the speed sensor on the RAM is abnormal or not, a sub-step S230 of diagnosing the signal of the speed sensor when the writing of the signal of the speed sensor on the RAM is not abnormal, a sub-step S231 of determining whether the signal of the speed sensor is abnormal or not, a sub-step S232 of outputting the signal of the speed sensor when the signal of the speed sensor is not abnormal, a sub-step S233 of receiving the signal of the shift position sensor, a sub-step S234 of checking suitability of the writing of the signal of the shift position sensor on the RAM, a sub-step S235 of determining whether the writing of the signal of the shift position sensor on the RAM is abnormal or not, a sub-step S236 of diagnosing the signal of the shift position sensor when the writing of the signal of the shift position sensor on the RAM is not abnormal, a sub-step S237 of determining whether the signal of the shift position sensor is abnormal or not, a sub-step S238 of outputting the signal of the shift position sensor when the signal of the shift position sensor is not abnormal, and a sub-step S239 of requesting the zero torques of the engine and motor by means of reset when the writing of the signals of the APS, speed sensor and shift position sensor on the RAM is abnormal or when the signals of the APS, speed sensor and shift position sensor are abnormal.

Here, as shown in FIG. 5a, when it is determined whether the second level sensors get out of order or not, the failure determination of the first level sensors is reflected. Only when it is determined that the first level sensors do not get out of order, the second level is reset (S240). When the first level gets out of order, the sensor output restriction of the first level is applied to the second level (S241).

The apparatus for controlling command torques in the HEV, according to one embodiment of the present invention, based on the above-mentioned construction will be described below with regard to its operation.

Power is applied to start the HEV. Thereby, an operation is initiated (S10), and the HCU 70 starts first level monitoring (S20).

When starting the first level monitoring, the HCU 70 diagnoses signals received from the APS 10, speed sensor 30 and shift position sensor 40. When the diagnosed signals are abnormal, output values are restricted and output (S30).

461 The process of diagnosing the signals received from the APS 10, speed sensor 30 and shift position sensor 40 will be described below in a little more detail.

First, the HCU 70 receives the signal of the APS 10 (S31), diagnoses the signal of the APS 10 (S32), and determines whether the signal of the APS 10 is abnormal or not (S33). When the signal of the APS 10 is abnormal, the HCU 70 restricts the output value of the signal of the APS 10 (S34), and outputs the signal of the APS 10 which is restricted in this way (S35).

Then, the HCU 70 receives the signal of the speed sensor 30 (S36), diagnoses the signal of the speed sensor 30 (S37), and determines whether the signal of the speed sensor 30 is abnormal or not (S38). When the signal of the speed sensor 30 is abnormal, the HCU 70 restricts the output value of the signal of the speed sensor 30 (S39), and outputs the signal of the speed sensor 30 which is restricted in this way (S40).

Subsequently, the HCU 70 receives the signal. of the shift position sensor 40 (S41), diagnoses the signal of the shift position sensor 40 (S42), and determines whether the signal of the shift position sensor 40 is abnormal or not (S43). When the signal of the shift position sensor 40 is abnormal, the HCU 70 restricts the output value of the signal of the shift position sensor 40 (S44), and outputs the signal of the shift position sensor 40 which is restricted in this way (S45).

In the manner, when the process of diagnosing the signals received from the APS 10, speed sensor 30 and shift position sensor 40 is terminated, the HCU 70 sets a driver demand torque (S50).

Then, the HCU 70 sets operating points such as an engine demand torque, an engine rpm, a generator demand torque, a generator rpm, a driving motor demand torque, a driving motor rpm and so on (S60).

Then, the HCU 70 determines whether the respective demand torques and rpms are within their own restriction values or not (S70), restricts outputs of the respective demand torques and rpms to the respective restriction values when the respective demand torques and rpms are not within their own restriction values (S80), and outputs the respective demand torques and rpms (S90).

After the above process is performed, the HCU 70 terminates the first level monitoring (S100) and stops the operation (S110).

Abreast of the above-discussed first level monitoring, the HCU 70 repeatedly receives the signals from the APS 10, speed sensor 30 and shift position sensor 40, and performs second level monitoring. The process of performing the second level monitoring will be described below.

Power is applied to start the HEV. Thereby, an operation is initiated (S200), and the HCU 70 starts the second level monitoring (S210).

When starting the second level monitoring, the HCU 70 diagnoses the signals received from the APS 10, speed sensor 30 and shift position sensor 40. When writing of the signals of the APS, speed sensor and shift position sensor on a RAM is abnormal, or when the signals of the APS, speed sensor and shift position sensor are abnormal, the HCU requests zero torques through reset (S220).

The process of diagnosing the signals received from the APS 10, speed sensor 30 and shift position sensor 40, and requesting the zero torques when the diagnosed signals are abnormal will be described below in a little more detail.

First, the HCU 70 receives the signal of the APS 10 (S221), checks suitability of the writing of the signal of the APS on the RAM (S222), and determines whether the writing of the signal of the APS on the RAM is abnormal or not (S223). When the writing of the signal of the APS on the RAM is not abnormal, the HCU 70 diagnoses the signal of the APS 10 (S224), determines whether the signal of the APS 10 is abnormal or not, and outputs the signal of the APS 10 when the signal of the APS is not abnormal (S226).

Then, the HCU 70 receives the signal of the speed sensor 30, checks suitability of the writing of the signal of the speed sensor on the RAM (S228), and determines whether the writing of the signal of the speed sensor on the RAM is abnormal or not (S229). When the writing of the signal of the speed sensor on the RAM is not abnormal, the HCU 70 diagnoses the signal of the speed sensor 30 (S230), determines whether the signal of the speed sensor 30 is abnormal or not (S231), and outputs the signal of the speed sensor 30 when the signal of the speed sensor 30 is not abnormal (S232).

Subsequently, the HCU 70 receives the signal of the shift position sensor 40 (S233), checks suitability of the writing of the signal of the shift position sensor on the RAM (S234), and determines whether the writing of the signal of the shift position sensor on the RAM is abnormal or not (S235). When the writing of the signal of the shift position sensor on the RAM is not abnormal, the HCU 70 diagnoses the signal of the shift position sensor (S236), determines whether the signal of the shift position sensor 40 is abnormal or not (S237), and outputs the signal of the shift position sensor 40 when the signal of the shift position sensor 40 is not abnormal (S238).

And, the HCU 70 reflects the failure determination of the first level sensors when determining whether the second level sensors get out of order or not, and resets the second level only when determining that the first level sensors do not get out of order (S240). When the first level gets out of order, the HCU also applies the sensor output restriction of the first level to the second level (S241).

Meanwhile, the HCU 70 requests the zero torques of the engine and motor through reset when the writing of the signals of the APS, speed sensor and shift position sensor on the RAM is abnormal or when the signals of the APS, speed sensor and shift position sensor are abnormal (S239).

In this manner, when the process of diagnosing the signals received from the APS 10, speed sensor 30 and shift position sensor 40 is terminated, the HCU 70 sets the driver demand torque (S250), and combines the engine and motor demand torques on the first level to calculate a first level output torque (S260).

Then, the HCU 70 determines whether the driver demand torque is less than the first level output torque or not (S270), and requests the zero torques of the engine and motor through reset when the driver demand torque is less than the first level output torque (S280).

Subsequently, the HCU determines whether each of the engine and the motor has the zero torque or not (S290), and resets software when each of the engine and the motor does not have the zero torque in spite of the request for the zero torques of the engine and the motor (S300).

After the above process is performed, the HCU 70 terminates the second level monitoring (S310), and stops the operation (S320).

As set forth above, the present invention is adapted to enable the information on the command torques to maintain the appropriate range by dividing the function of the HCU into the first and second levels and by having the function of setting the operating points of the HCU itself at the first level and the function of monitoring the first level torques at the second level. Further, the present invention is adapted to check whether the output command torques are within the restriction values prior to the output of the first level and restricting the outputs to the restriction values when the output command torques exceed the restriction values.

Thereby, it is possible to prevent hardware damage in advance, and to compare the drive demand torque calculated at the second level and the wheel torque of the first level to determine suitability of the output command torques.

Although exemplary embodiments of the present invention has been described for illustrative purposes, those skilled in the art will appreciate that various modifications, additions and substitutions are possible, without departing from the scope and spirit of the invention as disclosed in the accompanying claims.

What is claimed is:

1. An apparatus for controlling command torques in a hybrid electric vehicle, the apparatus comprising:
    an accelerator position sensor for sensing a position of an accelerator and outputting the sensed result as a signal;
    a speed sensor for sensing a speed of the hybrid electric vehicle and outputting the sensed result as a signal;
    a shift position sensor for sensing a position of a speed change gear and outputting the sensed result as a signal;
    a hybrid control unit for, when first level monitoring is initiated, diagnosing the signals received from the accelerator position sensor, speed sensor and shift position sensor, restricting and outputting output values of the signals when the diagnosed signals are abnormal, setting a driver demand torque, setting operating points such as an engine demand torque, an engine rpm (revolution per minute), a generator demand torque, a generator rpm, a driving motor demand torque, a driving motor rpm and so on, restricting outputs to respective restriction values when the respective demand torques and rpms are not within the restriction values, and outputting the respective demand torques and rpms; and
    a driver for driving an engine, a generator and a driving motor.

2. The apparatus as claimed in claim 1, wherein, when second level monitoring is initiated, the hybrid control unit diagnoses the input signals received from the accelerator position sensor, speed sensor and shift position sensor, requests zero torques of the engine and the motor through reset when writing of the signals of the accelerator position sensor, speed sensor and shift position sensor on a RAM (Random Access Memory) is abnormal or when the signals of the accelerator position sensor, speed sensor and shift position sensor are abnormal, sets the driver demand torque, combines the engine and motor demand torques on the first level to calculate a first level output torque, requests the zero torques of the engine and the motor through reset when the driver demand torque is less than the first level output torque, and outputs a control signal for resetting software when each of the engine and the motor does not have the zero torque.

3. The apparatus as claimed in claim 1, wherein the driver includes:
    a charge controller for controlling the charge of a battery;
    the battery for supplying power needed to drive the driving motor;
    an engine controller for outputting a control signal for controlling an internal combustion engine according to the control of the hybrid control unit;
    an engine electronic control unit for controlling the internal combustion engine according to the control of the engine controller;
    the internal combustion engine for generating rotating power using fuel energy;
    a generator controller for outputting a control signal for controlling a generator according to the control of the hybrid control unit;
    a driving motor controller for outputting a control signal for controlling the driving motor according to the control of the hybrid control unit;
    an inverter for outputting a driving signal for driving the generator and the driving motor according to the control signals of the generator controller and the driving motor controller;
    the generator for generating electric energy using the rotating power according to the driving signal of the inverter; and
    the driving motor for generating rotating power using the electric energy according to the driving signal of the inverter.

4. A method for controlling command torques in a hybrid electric vehicle, the method comprising the steps of:
    when starting first level monitoring, diagnosing signals received from an accelerator position sensor, a speed sensor and a shift position sensor and restricting and outputting output values when the diagnosed signals are abnormal;
    setting a driver demand torque;
    setting operating points such as an engine demand torque, an engine rpm (revolution per minute), a generator demand torque, a generator rpm, a driving motor demand torque and a driving motor rpm;
    determining whether or not the respective demand torques and rpms are within restriction values thereof;
    restricting outputs to the respective restriction values when the respective demand torques and rpms are not within the restriction values; and
    outputting the respective demand torques and rpms and terminating the first level monitoring.

5. The method as claimed in claim 4, wherein the step of diagnosing the signals of the first level monitoring includes the sub-steps of:
    receiving the signal of the accelerator position sensor, diagnosing the signal of the accelerator position sensor, and determining whether the signal of the accelerator position sensor is abnormal or not;
    when the signal of the accelerator position sensor is abnormal, restricting and outputting the output value of the signal of the accelerator position sensor;
    receiving the signal of the speed sensor, diagnosing the signal of the speed sensor, and determining whether the signal of the speed sensor is abnormal or not;
    when the signal of the speed sensor is abnormal, restricting and outputting the output value of the signal of the speed sensor;
    receiving the signal of the shift position sensor, diagnosing the signal of the shift position sensor, and determining whether the signal of the shift position sensor is abnormal or not; and
    when the signal of the shift position sensor is abnormal, restricting and outputting the output value of the signal of the shift position sensor.

6. A method for controlling command torques in a hybrid electric vehicle, comprising:
    when starting second level monitoring, diagnosing signals received from an accelerator position sensor, a speed sensor and a shift position sensor, and requesting zero torques of an engine and a motor through reset when writing of the signals of the accelerator position sensor, speed sensor and shift position sensor on a RAM (Random Access Memory) is abnormal or when the signals of the accelerator position sensor, speed sensor and shift position sensor are abnormal;

setting a driver demand torque, combining the engine and motor demand torques on the first level to calculate a first level output torque;

determining whether the driver demand torque is less than the first level output torque or not, and when the driver demand torque is less than the first level output torque, requesting the zero torques of the engine and motor through reset; and determining whether each of the engine and the motor has the zero torque or not, resetting software when each of the engine and the motor does not have the zero torque, and terminating the second level monitoring.

7. The method as claimed in claim 6, wherein the step of diagnosing the signals of the second level monitoring comprising:

receiving the signal of the accelerator position sensor, checking suitability of the writing of the signal of the accelerator position sensor on the RAM, and determining whether the writing of the signal of the accelerator position sensor on the RAM is abnormal or not;

when the writing of the signal of the accelerator position sensor on the RAM is not abnormal, diagnosing the signal of the accelerator position sensor, and determining whether the signal of the accelerator position sensor is abnormal or not;

when the signal of the accelerator position sensor is not abnormal, outputting the signal of the accelerator position sensor;

receiving the signal of the speed sensor, checking suitability of the writing of the signal of the speed sensor on the RAM, and determining whether the writing of the signal of the speed sensor on the RAM is abnormal or not;

when the writing of the signal of the speed sensor on the RAM is not abnormal, diagnosing the signal of the speed sensor, and determining whether the signal of the speed sensor is abnormal or not;

when the signal of the speed sensor is not abnormal, outputting the signal of the speed sensor;

receiving the signal of the shift position sensor, checking suitability of the writing of the signal of the shift position sensor on the RAM and determining whether the writing of the signal of the shift position sensor on the RAM is abnormal or not;

when the writing of the signal of the shift position sensor on the RAM is not abnormal, diagnosing the signal of the shift position sensor, and determining whether the signal of the shift position sensor is abnormal or not;

when the signal of the shift position sensor is not abnormal, outputting the signal of the shift position sensor; and requesting the zero torques of the engine and motor through reset when the writing of the signals of the accelerator position sensor, speed sensor and shift position sensor on the RAM is abnormal or when the signals of the accelerator position sensor, speed sensor and shift position sensor are abnormal.

* * * * *